United States Patent [19]
Crawford

[11] 3,962,503
[45] June 8, 1976

[54] DECORATIVE AND PROTECTIVE DEVICE FOR USE WITH A FLORAL CONTAINER

[76] Inventor: Mildred A. Crawford, 1206 Mathews St., Bowie, Tex. 76230

[22] Filed: Aug. 6, 1973

[21] Appl. No.: 385,957

[52] U.S. Cl. ............................... 428/40; 47/34 W; 47/44; 229/8; 229/87 P; 248/27.8
[51] Int. Cl.² ..................... B32B 3/04; A01G 9/02; A47G 7/08; B65D 65/00
[58] Field of Search .................... 161/17, 44, 43; 248/27.8; 47/41, 41.12, 41.13, 34, 34.11; 229/87 P, 8; 428/40

[56] References Cited
UNITED STATES PATENTS

| | | | |
|---|---|---|---|
| 1,520,647 | 12/1924 | Hennegan | 161/44 X |
| 1,610,652 | 12/1926 | Bouchard | 47/34 X |
| 2,113,888 | 4/1938 | Kaparin | 215/100.5 |
| 2,300,041 | 10/1942 | Bradley | 47/41.12 X |
| 2,355,559 | 8/1944 | Renner | 229/8 |
| 2,606,106 | 8/1952 | Albertson | 161/44 X |
| 2,774,187 | 12/1956 | Smithers | 47/41.12 |
| 3,336,697 | 8/1967 | Davis | 47/47.12 |

*Primary Examiner*—Philip Dier
*Attorney, Agent, or Firm*—Wayland D. Keith

[57] ABSTRACT

The present device is used in connection with floral arrangements which utilize a pot or vase with water therein, which water might spill or seep onto the surface of a piece of furniture, such as a table or the like. The device embodies a sheet of decorative foil which is cemented to a tray, which tray has an absorbent pad secured thereto by cement and to the bottom of the pot or vase, so when the decorative sheet is fashioned up around the container, the water will be held within the tray and the decorative foil sheet. One form of the invention provides for the tray to be made of a decorative sheet, with the absorbent pad to be placed on the flattened foil tray so that the decorative and protective device may be quickly formed about a pot when needed. This obviates the necessity of assembling the various components of the unit, at the time the floral arrangement is being made up.

2 Claims, 7 Drawing Figures

U.S. Patent  June 8, 1976  3,962,503
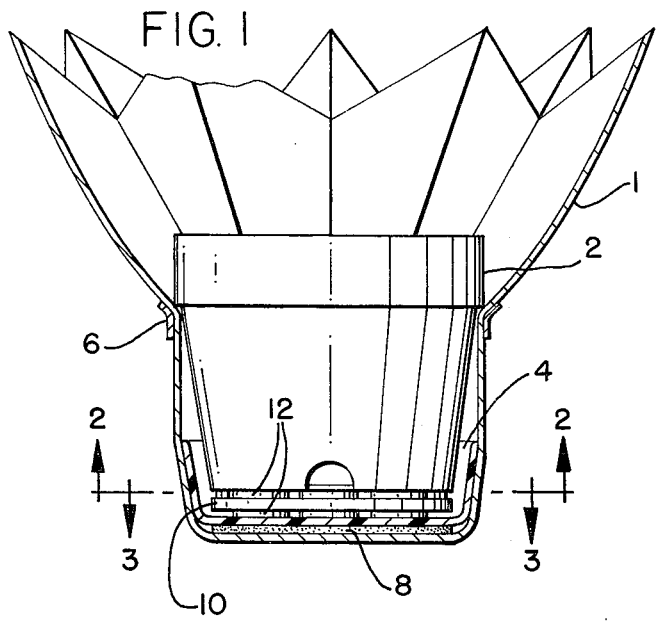
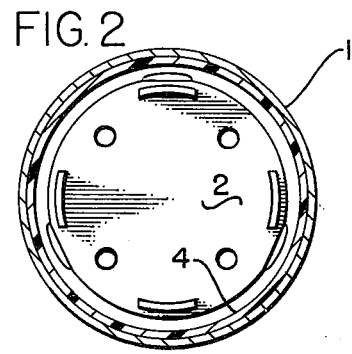
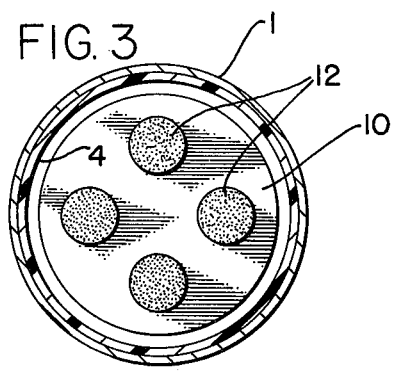
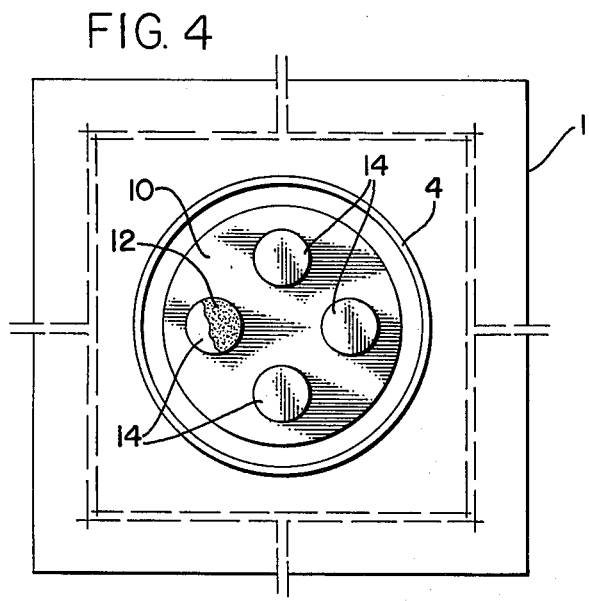
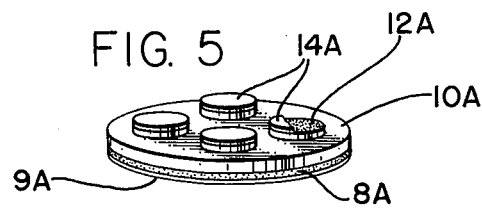
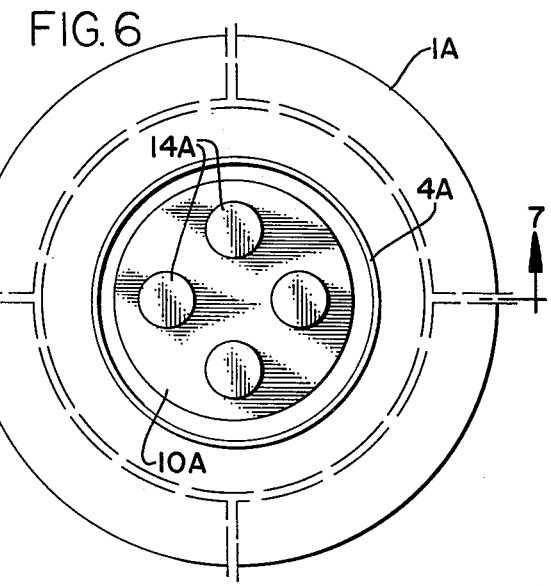
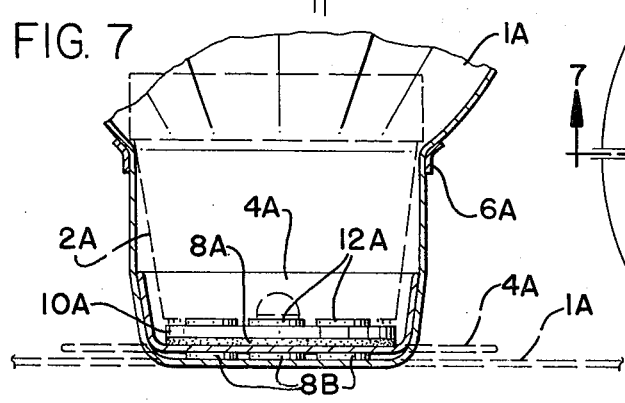

DECORATIVE AND PROTECTIVE DEVICE FOR USE WITH A FLORAL CONTAINER

SUMMARY OF THE INVENTION

This invention relates to a decorative, absorbent, moisture retaining, waterproof device for use with floral arrangements, both in pots and cut flowers in vases.

In decorating with containers of flowers, in order to get a desired effect, it is frequently desirable to place such flower containers on pieces of furniture, the finish of which must not be marred.

Heretofore it was necessary to use unsightly mats, trays or the like under the flower containers, in an effort to protect the furniture, but even so, the surface of the furniture was frequently marred by rings or spots caused by moisture.

The present device is a protective, absorbent, moisture retaining device which will adhere to the decorative portion of the device and no amount of moving or rearrangeing of the placement of the containers will dislodge the protective member which could result in an accident to the surface of the furniture, or the like on which the container is placed.

OBJECTS OF THE INVENTION

An object of this invention is to provide a combination absorbent, moisture retaining, waterproof, decorative device for use with flower containers.

Another object of the invention is to provide a decorative, absorbent, moisture retaining, and moisture proof device for use with containers of flowers, which device will adhere to the container and the the decorative, protective portion of the device, thereby facilitating the handling of the containers, without the protective device becoming disarranged, which could result in accidents to the surfaces on which the flower arrangements are placed.

Another object of the invention is to provide a decorative, protective, absorbent, moisture retaining, waterproof device for use with flower containers which will aid in keeping the flowers fresh by retaining the moisture, but which moisture is not allowed to seep onto the surface on which the container is placed, to result in damage to the surface.

A further object of the invention is to provide a decorative, waterproof, moisture retaining, absorbent device which can be assembled flat for shipment and/or storage but which can be quickly readied for use.

Still a further object of the invention is to provide the absorbent and moisture retaining portion of the protective device with areas of pressure sensitive, permanently tacky adhesive or double faced, pressure sensitive, permanently tacky tape on one or both sides thereof to hold the absorbent, moisture retaining member in fixed relation with the container and/or the decorative, waterproof portion of the device.

Yet another object of the invention is to provide a protective, disposable sheet of Holland cloth or treated paper on the adhesive or tape area of the absorbent, moisture retaining member during shipment and/or storage.

BRIEF DESCRIPTION OF THE DRAWINGS

With these objects in mind and others which will become manifest as the description proceeds, reference is to be had to the accompanying drawings in which like reference characters designate like parts in the several views thereof, in which:

FIG. 1 is an elevational view showing a flower pot, a moisture receiving tray thereunder, with an absorbent pad adhesively secured to the flower pot and to the tray to prevent relative movement therebetween, showing the moisture receiving tray in section, and showing the decorative, waterproof sheet surrounding the flower pot, which sheet is held in place by a band, ribbon or the like;

FIG. 2 is a sectional view taken on the line 2—2 of FIG. 1, looking upwardly at the bottom of the flower pot;

FIG. 3 is a sectional view taken on the line 3—3 of FIG. 1, looking in the direction indicated by the arrows, showing the circumferentially spaced adhesive areas on a moisture absorbing pad, such as blotting paper stock or the like, showing a cross section of the water receiving tray and the decorative, waterproof sheet;

FIG. 4 is a top plan view of one form of the invention, showing the water receiving tray assembled on and secured to a rectangular sheet of waterproof, decorative material, such as foil, processed paper, plastic or the like, with parts of the decorative sheet being cut away and reduced in size, and showing an absorbent pad within the water receiving tray, with the adhesive areas securing the pad thereto, the Holland cloth or treated protective covering for the adhesive areas having been removed;

FIG. 5 is a perspective view of the absorbent pad, showing circumferentially spaced adhesive areas thereon, which areas are shown to be covered with Holland cloth or treated paper on three such areas, with one such area being shown without the Holland cloth or treated paper protective covering thereon to expose the adhesive;

FIG. 6 is a top plan view of a modified form of the invention which is similar to that shown in FIG. 4, but with a foil water receiving tray, and showing the moisture absorbent pad secured to the foil tray, with the tray being secured to the decorative sheet, showing the adhesive areas circumferentially spaced on the absorbent pad, with the Holland cloth or treated paper covering the adhesive areas, also showing a portion of the decorative sheet of material as cut away and removed in order to bring out enlarged details of construction of the invention;

FIG. 7 is a sectional view taken on the line 7—7 of FIG. 6, showing the modified form of the invention in section, showing a water receiving tray in full outline to show how the moisture receiving pad is cemented to the bottom of the moisture receiving tray, showing how the moisture receiving tray is secured to the sheet of decorative material, showing a flower container in dashed outline in one position, and showing the foil tray and the decorative sheet flattened, in dashed outline, in another position.

DETAILED DESCRIPTION OF THE PREFERRED EMBODIMENT OF THE INVENTION

With more detailed reference to the drawing, the numeral 1 indicates generally a decorative, water resistent sheet of material, such as foil, plastic or processed paper, which is used around a flower pot 2 and tray 4 to allow the moisture which escaped from the pot or container 2 to be received and retained by the tray 4, which is of foil or the like. The tray 4 and the protective sheet prevent the moisture from escaping onto the surface of a table or the like on which the container of flowers is placed. A ribbon or band 6 is shown surrounding the sheet 1 so as to maintain the sheet in place.

The sheet 1 is shown to be cemented, as indicated at 8, to the bottom of the tray 4, which tray has a pad of material 10 within the tray, which pad of material is made of absorbent material such blotter stock, and has circumferentially spaced, pressure sensitive, permanently tacky cement or adhesive spots 12 on each side thereof so as to adhere to the pad of water absorbent material 10 and one set of adhesive spots will adhere to the lower face of the pot or container 2, so as to maintain the pot or container in fixed relation with respect to the tray 4 and to the sheet of material 1. The spots of adhesive material 12 may be double faced adhesive tape of a character which is waterproof and which has Holland cloth or treated paper covering 14 thereon so as to prevent sticking to undesired objects until it is desired to assemble a pot or the like into the tray 4. The cement or double faced adhesive tape has been accentuated. in the drawing, as to thickness in several views thereof, for the sake of clarity. However, it may be of any desired thickness.

While a flower pot of a particular design and shape has been shown, it is to be understood that any type container, such as a pot vase or the like, may be used, as the pot or container is separately purchased. The unit may have a decorative sheet 1, either rectangular as indicated in FIG. 4, or round as indicated in FIG. 6. However, various other shapes may be had without departing from the spirit of the invention.

The tray 4, having the pad of absorbing material 10 secured therein, as shown in FIG. 4, together with the sheet of decorative material 1 may be clustered together by stacking one above another in nested relation to permit shipment and storage of a great number of units in a minimum of space.

A unit may be removed from the nested arrangement, ready to set a container 2 in place and the decorative sheet 1 may then be formed into the desired shape about the container so that the making of a floral arrangement is expedited by not having to cut the sheet of decorative material from a roll, collect the various components and assemble these. In this manner the preparation of a floral arrangement is greatly expedited. The sheet of material 1 which is so constructed as to prevent water passing therethrough, will be held in place by the cementitious or adhesive pads or tapes 12. The adhesive or cementitious spots or tapes each has a safety covering of Holland cloth, treated paper or the like, which may be quickly removed to permit the final assembly of the container 2 on the tray 4, the decorative sheet 1 and the absorbent pad 10 in a minimun of time. The band 6 surrounds the sheet 1 and the container 2 when assembled.

MODIFIED FORM OF THE PREFERRED EMBODIMENT

A modified form of the invention, as shown in FIGS. 5, 6, and 7, involves the use of the sheet of decorative material, such as foil, as shown at 1A, and a water resistant sheet of material, such as foil, plastic, or processed paper, which could be formed into a tray as shown in FIG. 7. In this particular instance the sheet of decorative material is shown to be round, as a matter of illustration, but it may be of any shape. A pad of absorbent material 10A is secured to the tray 4A by cement 8A. The pad of absorbent material 10A may be of any desired thickness to absorb the moisture which passes from or is spilled from the pot or container 2A and tray 4A. With the decorative sheet of material 1A arranged around the pot or container 2, similar to the arrangement shown in FIG. 1, the moisture will be retained within the decorative sheet.

In this form of the invention, the adhesive spots of cement or tape 12A are on one side only of the absorbent pad 10A, with Holland cloth or treated paper 14A being used to temporarily cover and protect the adhesive faces 12A. The opposite side is coated with a cement or adhesive 8A, with a sheet of Holland cloth or treated paper 9A being fitted thereover so as to protect the adhesive against sticking to an unwanted object until it is desired to assemble the unit.

The units, as shown in FIGS. 5, 6, and 7 are such that they may be assembled at a factory and shipped to a jobber or florist, then the protective covering of Holland cloth or treated paper is removed and the container, such as a flower pot, vase or the like 2A seated in cemented relation thereon, as indicated in dashed outline in FIG. 7.

As shown in FIG. 7 tray 4A is cemented at 8B to sheet 1A in a manner similar to the method by which tray 4 is cemented at 8 to sheet 1 in FIG. 1.

By having sheets 1A cut to the desired shape and size and with the absorbent pad 10A, as shown in FIG. 5, cemented thereto, as shown in FIGS. 6 and 7, a floral design may be created expeditiously, and this form of the invention utilizes a foil tray 4A, as the decorative sheet 1A is of such thickness and quality as to hold moisture therein, which might otherwise pass from the container onto the surface under the container.

When in flattened condition, a minimum of space is required for shipping and storage, and the foil is of a thickness that the tray 4A and the sheet of decorative material 1A may be quickly hand formed around the container 2A.

I claim:

1. A device for use with a floral container to retain moisture within said container, said device comprising:
    a water resistant sheet of flat material large enough to cover a substantial portion of said container when hand formed about said container:
    a layer of cementitious material deposited on said water resistant sheet:
    a tray positioned on said cementitious layer such that said tray is secured to said water resistant sheet:
    a pad of absorbent material having circumferentially spaced, pressure sensitive, permanently tacky, waterproof, adhesive spots deposited on each side of said pad of absorbent material to adhesively secure said pad to said tray and to the lower face of the container;
    removable Holland cloth positioned over said adhesive spots deposited on each side of said pad to provide a temporary covering therefor.

2. The device of claim 1 wherein said pad of absorbent material comprises a pad of blotter stock.

\* \* \* \* \*